United States Patent [19]
Williamson

[11] 4,054,821
[45] Oct. 18, 1977

[54] D-C MOTOR DRIVE SYSTEM WITH FIELD CURRENT FLOW REVERSAL UPON TRANSITION BETWEEN MOTORING AND RETARDING MODES

[75] Inventor: Dennis Francis Williamson, Erie, Pa.

[73] Assignee: General Electric Company, Erie, Pa.

[21] Appl. No.: 641,846

[22] Filed: Dec. 18, 1975

Related U.S. Application Data

[63] Continuation of Ser. No. 502,202, Aug. 30, 1974, abandoned.

[51] Int. Cl.² .......................... H02D 3/14; H02D 3/18
[52] U.S. Cl. .................................... 318/375; 318/493; 318/381
[58] Field of Search ............... 318/375, 376, 379, 380, 318/381, 505, 506, 507, 247, 248

[56] References Cited

U.S. PATENT DOCUMENTS

| | | | |
|---|---|---|---|
| 2,855,553 | 10/1958 | Morgan | 318/248 |
| 3,515,970 | 6/1970 | Weiser | 318/249 |
| 3,660,738 | 5/1972 | Anderson et al. | 318/375 |
| 3,735,220 | 5/1973 | Renner et al. | 318/493 |
| 3,753,059 | 8/1973 | Berman | 318/376 |
| 3,811,080 | 5/1974 | Morton et al. | 318/380 |
| 3,866,098 | 2/1975 | Weiser | 318/381 |

OTHER PUBLICATIONS

Millermaster, "Hardwoods Control of Electric Motors" pp. 171-173, Wiley Interscience, 1970.

*Primary Examiner*—Robert K. Schaefer
*Assistant Examiner*—John J. Feldhaus
*Attorney, Agent, or Firm*—J. H. Beusse

[57] ABSTRACT

A d-c motor drive system, useful for propelling and retarding electrically propelled traction vehicles, wherein the armature winding has a first terminal coupled through an armature chopper to a first polarity conductor of a d-c source, and a second terminal coupled through a breaker switch to a second polarity conductor of the d-c source. First and second controlled rectifiers are connected across the first and second conductors in a self commutating circuit such that they conduct sequentially and alternatively. Means are provided for varying their respective conduction time intervals to control the voltage at their junction. Field winding means are coupled from the junction of the controlled rectifiers to the junction of the armature second terminal and the breaker. During the motoring mode with the breaker closed field current flows in a first direction. During the retarding mode with breaker open and the second terminal of the armature coupled by a diode to the first conductor, field current flows in an opposite direction to permit d-c motor to operate as a retarding generator.

14 Claims, 3 Drawing Figures

D-C MOTOR DRIVE SYSTEM WITH FIELD CURRENT FLOW REVERSAL UPON TRANSITION BETWEEN MOTORING AND RETARDING MODES

This is a continuation, of application Ser. No. 502,202, filed Aug. 30, 1974 now abandoned.

BACKGROUND OF THE INVENTION

This invention relates to direct current drive motor systems adapted to selectively drive or electrically retard heavy mechanical loads, such as traction vehicles, and more particularly, to an improved arrangement for energizing motor field during motoring and braking modes.

Electric drive systems for high inertia loads, such as traction vehicles, must be designed to propel the load, and to electrically retard (commonly termed "electrically brake") the load in accordance to predetermined torque vs. speed relationships and other selected parameters. Direct current motors having armature and field windings commonly are controlled by modification of their armature and field flux. U.S. Pat. No. 3,515,970, for example, discloses an arrangement for selectively controlling both armature current and field flux.

The propulsion torque of a d-c motor is proportional to the product of armature current and field strength. During the propulsion, i.e. motoring mode, maximum torque control can thus be effected by separately controlling the armature and field currents of d-c motors. At low motor speeds the counter *emf* is very low resulting in high armature current. Armature current at low speeds can be limited to acceptable levels by controlling the voltage applied to the armature, such as by variable impedance means connected serially between the source and the armature. Chopper switching circuits are commonly utilized for this purpose, the chopper switch being periodically commutated so that its duty cycle is variable so as to be inversely proportional to the effective impedance to be inserted serially with the armature. Such chopper circuits also commonly utilize unilaterally conducting means, termed "free wheeling" diodes, coupled in parallel with the armature circuit, e.g. armature winding and motor reactor, and poled to conduct circulating armature current during intervals when the chopper switch is cut off. Sufficient starting torque can be attained, even with separately excited motors, by application of sufficient field current. Thus control of both armature voltage and field current permits attainment of adequate torque characteristics over a wide speed range.

Control of electric retardation can similarly be obtained by armature and field control. During electric retardation, the motor acting as a generator provides armature current to a retarding, i.e. dissipative, load, which in the case of dynamic retardation, commonly termed "dynamic braking," comprises a resistance load, and in the case of regenerative retardation, commonly termed "regenerative braking" constitutes the energy source of the motor. The co-pending application Ser. No. 433,409 of E. F. Weiser now (U.S. Pat. No. 3,866,098), explains how retardation is attainable by controlling both armature current and field flux. In chopper systems electric retardation may be attained by coupling the motor armature circuit in shunt with the dissipative load, e.g. dynamic braking resistance or d-c source. The chopper switch is commonly coupled in parallel with the armature circuit so that variation of the chopper duty cycle controls armature current over a range of speeds and the resulting range of armature voltage.

Drive systems of the type discussed must be readily convertible between the motoring, i.e. propulsion, mode and the retardation, i.e. braking, mode. This requires a change of operating condition such as reversal of the field or of the armature connection. This has, for example, been accomplished by switching the armature terminals so as to reverse armature polarity in respect to field polarity. However, excessive currents occur if the switching time is not precisely controlled so as to occur, for example, prematurely during an interval when motor current flows. Alternatively, mode switching has been accomplished by switching the field terminals so as to reverse motor field. Such switching must be accomplished so that adequate field current is built up to overcome remnance motor flux. In general, switching the commonly utilized self-excited series d-c machines from motoring to braking is subject to temporary voltage transients, resulting from the change of inductive armature currents, and in delays in affecting mode switching.

OBJECT OF THE INVENTION

It is therefore an object of this invention to provide an improved d-c motor control system having separately excited fields in the motoring mode which is readily and rapidly switchable between motoring and retarding modes.

It is a further object to provide such a system which is capable of smoothly controllable field excitation in both the motoring and braking modes.

It is another object that such system permits mode switching with minimum contactors, and achieves the above-stated functions with minimal components and parts.

It is an additional object to provide an improved d-c motor control system for traction vehicles providing smooth transition between motoring and braking modes and adaptable for regenerative and dynamic braking.

It is yet a further object to provide such an improved d-c motor control system adapted to control plural traction motor groups with common armature and field control circuits.

SUMMARY OF THE INVENTION

This invention relates to a d-c motor propulsion system wherein one terminal of the motor armature means is coupled to a first polarity conductor of d-c energy solely during the motoring mode by breaker switch means, and is coupled to a second polarity conductor of d-c energy by means conductive solely during the braking mode. Field windings are coupled from said one terminal to a controllable source of d-c potential, such that field current flows in a first direction when the breaker is closed during the motoring mode, but flows in a reversed direction when the breaker is open during the retarding mode. Field current, and thus field excitation, is controlled by varying the output of the controllable source. Preferably the controllable source of d-c potential comprises back-to-back connected switching devices, e.g. choppers, coupled across the conductors in a self commutating arrangement, such that the devices conduct alternately. The field windings are coupled to the junction of the devices, whose potential is controllable by varying the respective conduction time of the devices.

In a preferred embodiment an armature chopper is coupled between the second polarity conductor and the other terminal of the armature means. Unilaterally conducting means poled to conduct free wheeling current are coupled from the other terminal to the first polarity conductor, and unilaterally conducting means, poled to conduct generated armature current during the regenerative mode, is coupled from the one terminal of the armature means to the second polarity conductor. Plural motors connected in series, parallel or series parallel combination may be controlled by a common armature chopper and a common source of controllable field potential.

The novel features believed characteristic of this invention are set forth with particularity in the appended claims. The organization and manner of operation of the invention, together with further objects and advantages thereof, may best be understood by reference to the following description taken in connection with the accompanying drawings in which:

DESCRIPTION OF THE PREFERRED EMBODIMENT

Figure 1:
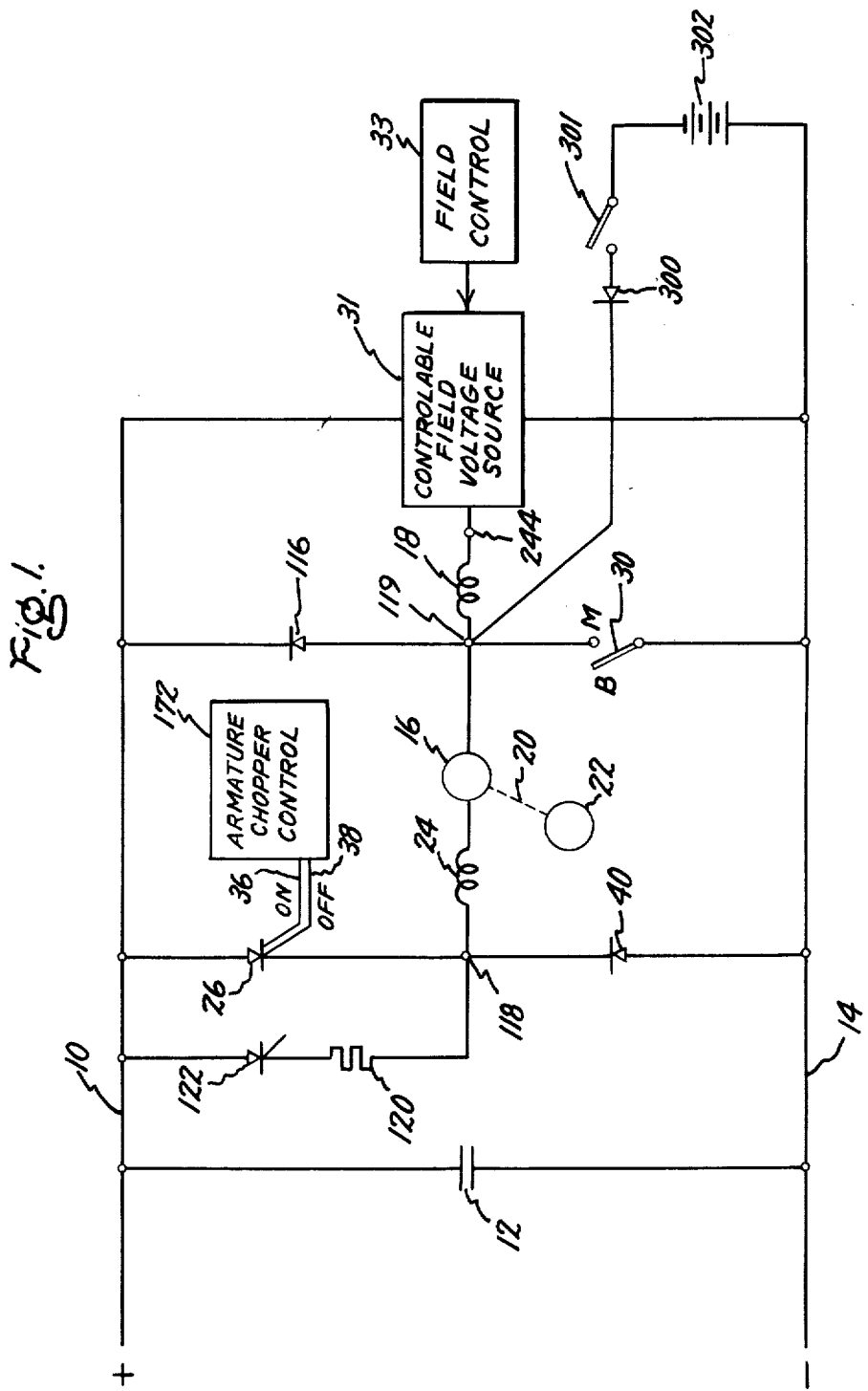
FIG. 1 is a simplified diagram of a motor control system illustrating a preferred embodiment of the invention.

FIG. 1 illustrates one embodiment of the invention in simplified form. It incorporates a chopper circuit in the motor armature circuit useable to control armature current both during braking and motoring without reconnection. Conduction lines 10 and 14 are, respectively, adapted for connection to positive and negative terminals of a source of direct current. In the case of electric locomotives or transit vehicles, these are commonly provided, by catenary-pantographs or third rail and collector systems. Capacitor 12 is a part of a filter system, which, in addition to other features, is more fully described in connection with FIG. 2. FIG. 1 illustrates a d-c motor comprising armature 16 and field winding 18. Armature 16 is mechanically coupled, as schematically illustrated by line 20, to a mechanical load 22. In the case of traction vehicles the load normally is a driven wheel axle of the vehicle. (For purposes of the present description it is assumed that the load is always moving in a given direction. In order to change directions, appropriate reversing means should be added to the illustrated motor control system as is known in the art.) Plural motors may be connected in series, in parallel, or in series parallel combination as, for example, described in connection with FIG. 2. One terminal of armature 16 is connected through motor reactor 24 and armature chopper 26 to positive line 10. The other terminal of the motor armature is connected through breaker switch 30 to the negative line 14. The illustrated breaker is preferably a single pole - single throw switch which is adapted to be closed during the motoring mode and open during the retarding mode. Thus during the motoring mode with breaker 30 closed, the motor armature is connected conventionally between the conduction lines 10 and 14 by a series circuit comprising chopper 26, the motor reactor 24, armature 16 and breaker 30.

As is well-known the chopper is essentially a switch which is periodically opened and closed. Control is affected by armature chopper control 172 which supplies an "ON" gating signal to the chopper on line 36 and an "OFF" gating signal to the chopper on line 38. The conduction duty cycle can be conventionally controlled by time ratio control of the "ON" and "OFF" periods of the chopper. Choppers conventionally utilize as a switch a controlled rectifier which is capacitance commutated under control of the chopper control circuit. Chopper circuits are disclosed, for example, in the General Electric Company SCR Manual, fourth Edition. Section 11.2.3 and in referenced U.S. Pat. No. 3,515,970. It should be noted that the subject invention may be utilized in conjunction with alternate armature circuit arrangements which do not utilize such a chopper circuit.

In the motor mode the chopper 26 is periodically closed to permit current flow through the armature circuit. Unilaterally conducting means 40 is conventionally connected between line 14 and junction 118 of chopper and motor reactor 24 and poled to conduct armature "free wheeling" current during intervals when the chopper is grated OFF.

As described subsequently the inventive arrangement provides for changing the operating state of the drive system as between the motoring and retarding modes by operating breaker 30. The system is switched from the motoring to the retarding mode by opening the breaker which removes d-c energization from the armature means and simultaneously reverses the direction of field current flow in a manner to be described. Because of the field current reversal, the motor operates, during the retarding mode, as a generator with armature current flow continued in the same direction as during the motoring mode but with armature voltage polarity reversed.

In the described embodiment, armature chopper 26 may be periodically switched in the braking mode with its conduction duty cycle being related to the desired braking torque. Unilaterally conducting means 116 is connected between line 10 and junction 119, between the armature 16 and breaker 30 and poled to conduct during the retardation interval so as to complete the armature circuit comprising the armature 16, device 116, line 10, chopper 26, and motor reactor 24. Conceivably a simple switch, closed solely during the retarding mode (i.e., when breaker 30 is open), could be used in lieu of rectifier 116. During intervals when the chopper is cut off, generated armature current is dissipated in a load circuit. For dynamic retardation controlled rectifier 122 and dynamic retarding resistance 120 are connected serially from line 10 to junction 118, i.e. in parallel with chopper 26. With device 122 gated on, generated armature current flows in the circuit comprising armature 16, devices 116 and 122, resistance 120 and motor reactor 24. During dynamic retardation the armature and dynamic retarding circuit is usually disconnected from the d-c source of potential, such as by disconnecting line 10 from the positive terminal of the d-c power source. For regenerative retardation, generated armature current may be supplied to the external source of d-c in the circuit comprising armature 16, device 116, line 10, the source of d-c (not shown in FIG. 1), line 14, device 40 and motor reactor 24.

The following is a description of the field energization arrangement. A controllable source of field potential 31 has its inputs connected to conduction lines 10 and 14 and provides a controllable voltage output at terminal 244. A field control circuit 33 is utilized to controllably vary the output voltage at terminal 244 intermediate the potentials appearing at lines 10 and 14, respectively. Device 31 may comprise variable impedance or gating devices connected respectively between line 10, output terminal 244, and line 14. A preferred arrangement described in connection with FIG. 2 utilizes controlled rectifiers connected back-to-back in a self commutating arrangement of the general type described in Section 7.4, page 190, in "Principles of Inverter Circuits." by Bedford and Hoft, John Wiley & Sons, 1964. The auto impulse commutative inverter described therein has alternatively conducting back-to-back connected controlled rectifiers whose relative conduction time may be varied responsive to externally supplied gating signals. The average voltage at output terminal 244 may thus be varied intermediate the potentials on lines 10 and 14 by controlling in field control 33 the time occurrence of the gating pulses supplied by the field control to the controlled rectifiers.

The field winding means 18 are connected from junction 119 to output terminal 244. During the motoring mode, breaker 30 is closed so as to connect one end terminal of the field winding means to negative conduction line 14. Since the other terminal of the field winding is connected to output terminal 244, field current flows from positive conduction line 10 through source 31, output terminal 244, field 18, breaker 30, to negative conduction line 14. The magnitude of field current is a function of the voltage at output terminal 244, i.e. the field current equals the average voltage difference between terminal 244 and line 14 divided by the resistance of the field winding means 18. Thus during the motoring mode, field current flows in a first direction and has a magnitude controllable by field control 33.

During the retarding mode, breaker 30 is opened. In view of the resulting conduction of generated armature current through diode 116 (generated armature current substantially exceeding field current) the voltage at junction 119 is substantially clamped to line 10. The voltage at 119 differs from that at line 10 only by the forward drop across diode 116. Accordingly the potential at junction 119 is switched from the potential at line 14 to the potential at line 10. If the potential at junction 244 is assumed to be intermediate the potentials at lines 10 and 14, the potential across the field means 18 is reversed from the condition prevailing during the motoring mode, and current flow is reversed. Thus changing between the retarding and motoring modes results in a reversal of potential across the field means and also a change of reversal in field current.

During retardation generated armature current is supplied through diode 116 through the load dissipation or chopper circuit, as previously described. Additionally the armature supplies the necessary field current in a self excited system mode. For example, during intervals when the free wheeling diode 40 conducts, a current path is established through armature 16, field means 18, the impedance segment of device 31 between junction 244 and line 14, diode 40 and reactance 24. The retarding cycle is initiated as follows. The armature chopper 26 device is gated into the non-conducting condition in a fashion to reduce motoring torque and current to zero at a rate determined by the armature control circuitry, 172. At or near zero armature current, switch 30 is opened to position B, FIG. 1. Usually lines 10 and 14 are disconnected from the power source in the case of dynamic retarding but would remain connected in the case of regenerative retarding. Assuming the case of dynamic retarding first, after device 30 is switched open, chopper 26 is gated on and field control 33 is controlled to have terminal 244 essentially switched to line 14. It will be seen that a current will flow from filter capacitor 12, line 10, chopper 26, reactor 24, armature 16, field 18 and into line 14. This current flow reverses the remnant flux in field 18 causing the polarity of the armature terminals to reverse with respect to the motoring condition. As this polarity builds up due to current build up in field 18, armature terminal voltage will build up also. The moment that armature potential exceeds the combined forward drops of device 116 and chopper 26, current will flow in path 116, chopper 26, reactor 24 and armature 16. Current will continue to flow from terminal 119 into field 18 causing current to continue to increase. When armature current in device 116 exceeds field current in 18, it can be shown by superposition of currents that current in field 18 essentially flows from capacitor 12, line 10, "backwards" through 116, through 18 as before and back to line 14. Because of the low d-c resistance to current in the armature-chopper path, armature current is going to increase at a rate greater than that usually desired. This will cause the chopper to commutate off in order to reduce current and the ON-OFF time ratio of the chopper will be in continuous adjustment to regulate armature current to the desired value. Conventially this desired current may be a ramp function so as to limit jerk on a decelerating traction vehicle. When the chopper is off, armature current flows into line 10, capacitor 12, line 14, device 40, reactor 24 and into armature 16. This action restores energy in the filter capacitor which was partially depleted during the field current reversal period. When voltage on capacitor 12 reaches some predetermined amount, a control device not described and not pertinent to this disclosure, gates on device 122 providing an alternate path for armature current other than capacitor 12. The sequence then in dynamic retarding is to first turn on chopper 26, commutate chopper 26 in response to rising current, then turn on device 122 in response to another control parameter which for purposes of illustration could be the sensing of potential between line 10 and 14. Capacitor 12 is then the real source of current for field 18, and this energy is periodically restored as described. If it is assumed that excitation current, in a numerical example, is 10 amperes and armature current is 100 amperes it can be seen that an average component of armature current of 10 amperes flows into capacitor 12 and ultimately into field 18, and an average component of 90 amperes flows into resistor 120. Control means can adjust the gating of devices 26 and 122 to maintain an essentially constant voltage between lines 10 and 14.

The circuit behaves in a similar manner in the regenerative retarding mode as described except that the filter capacitor does not play as an important part as before because the power source maintains a constant voltage between lines 10 and 14. Since capacitor 12 cannot be charged up to a potential greater than line 10 potential, thyristor 122 would not be gated on. There would then be only the condition of having chopper 12 on which causes current in the armature to increase through the described path (i.e. device 116, chopper 26, reactor 24 and armature 16) or when the chopper is off current will decrease through device 116, into line 10 and the source (not shown), through line 14, device 40, reactor 24 and armature 16. This increase and decrease of armature current is the ripple component associated with chopping circuits. The chopper on-off ratio is controlled to adjust average armature current to be the desired value.

Two independent special features will now be described. The initial stored magnetic energy in the motor field is not dissipated in the switching arc as would occur if electromechanical means of field reversal were employed. Opening contactor 30 with field current flowing in the first sense out of 244 into 18, causes device 116 to clamp the induced voltage on the field to the voltage of capacitor 12.

A second valuable feature is the ability to boost field in the retarding direction by the use of the control power battery as shown in FIG. 1. If for some reason the voltage on capacitor 12 were to collapse before flux in field 18 became properly established for the retarding mode, switch 301 can be closed allowing current to flow from the battery, through blocking diode 300 into junction 119, field 18, through control 31 and back through line 14 to the control battery 302. As self build up proceeds in the usual manner, diode 300 would finally block reverse current from flowing into the battery when line 10 exceeds the battery voltage.

Figure 2:
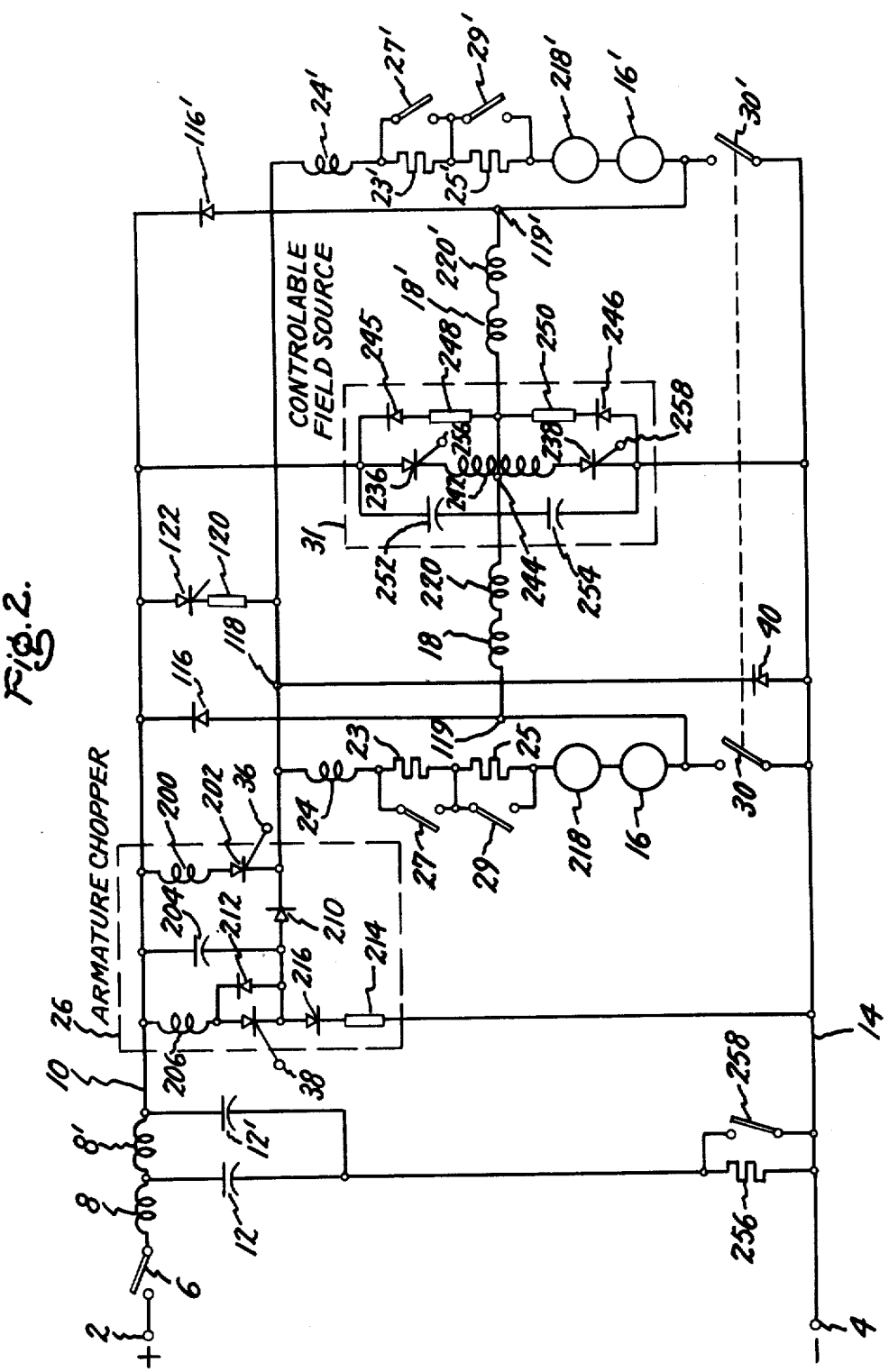
FIG. 2 is a schematic diagram of a preferred embodiment of the invention.

Attention is now directed to FIG. 2 which illustrates a preferred embodiment utilizing the arrangement described above in connection with FIG. 1 and utilizes parallel connected sets of two serially connected motor armature circuits. Similar components are therefore identified by common identification and numerals.

Positive terminal 2 is connected through suitable breaker and line switch 6 and filter reactors 8 and 8' to positive line 10. Filter capacitor 12 is connected from the junction of filters 8 and 8' through resistor 256 to negative line 14. Filter capacitor 12' is connected from junction of inductance 8' and line 10 to resistor 256. Resistor 256 is shunted by switch 258. Under normal conditions the contactor is closed so as to shunt out resistance 256. The contactor 258 is opened when the voltage across capacitor 12' decreases substantially. This may be accomplished by a voltage sensor not shown, connected across the filter capacitor. This provides for soft charging, i.e. it avoids an excessive in-rush of current to the filter during energization. Such a soft charge circuit may of course be connected in another position of the series circuit comprising line terminals 2 and 4 and the filter.

The armature chopper 26, of a type similar to that disclosed in U.S. Pat. No. 3,515,970, is connected between lines 10 and junction 118. The chopper comprises a main chopper reactance 200 and main controlled rectifier 202 connected serially between line 10 and junction 118. A commutating capacitor 204 is connected in parallel with series connected commutating reactance 206 and commutating controlled rectifier 208. Reactances 206 and 200 are connected to line 10, and the cathode of rectifier 208 is connected serially with coupling diode 210 to junction 118. Controlled rectifiers 202 and 208 are poled in the forward direction and their control gates are, respectively, connected to "ON" terminal 36 and "OFF" terminal 38. A commutating diode 212 is connected in parallel with rectifier 208 and oppositely poled in respect thereto. A charging network comprising resistor 214 and diode 216 is connected from negative line 14 to the junction of diodes 210 and 212, rectifier 208 and capacitor 204.

Four motors are connected in series parallel configuration between junction 118 and negative line 14. A first circuit comprises serially connected motor reactor 24, braking resistors 23 and 25, which are shunted, respectively, by contactors 27 and 29, first motor armature 218, second motor armature 16, and breaker switch 30. A second motor armature circuit, connected in parallel with the first circuit, comprises serially connected motor reactor 24', braking resistances 23' and 25', shunted respectively by contactors 27' and 29', third motor armature 218', fourth motor armature 16' and breaker switch 30'. The breaker switches 30 and 30' are each illustrated as a single pole single throw switches mechanically ganged. Therefore they could constitute a single pole double throw switch arrangement. Free wheeling diode 40 is connected from line 14 to junction 118. Unilaterally conducting means 116 is connected from the junction of armature 16 and switch 30 to line 10. Unilaterally conducting means 116' is connected from the junction of armature 16' and switch 30' to line 10. Devices 116 and 116' are poled to conduct generated armature current during the retarding mode. The above described arrangement of FIG. 2 is similar to that described in connection with the above-referenced copending application Ser. No. 433,409 of E. F. Weiser.

A dynamic retarding circuit comprising controlled rectifier 122 and dynamic retarding resistance 120 is connected between line 10 and junction 118.

Controllable field source 31 connected between lines 10 and 14 has an output terminal 244. The first motor field 220 and the second motor field 18 are serially connected between terminal 244 and junction 119, between armature 16, breaker 30 and the unilaterally conducting means 116. Similarly, fourth motor armature 18' and third motor armature 220' are connected serially from terminal 244 to junction 119', between devices 16', 30' and 116'.

Field source 31 utilized in the preferred embodiment constitutes a complementary impulse commutated inverter of the general type described in Section 7.4 of the Bedford and Hoft book previously referenced. Use of a similar circuit for other purposes is disclosed in the previously referenced co-pending application Ser. No. 433,409 of E. F. Weiser. A series circuit between lines 10 and 14 comprises controlled rectifiers 236 and 238 and an intermediate center-tapped inductance 242. The anode of device 236 is connected to line 10, its cathode is connected to one end terminal of inductance 242. The anode of device 238 is connected to the other end terminal of inductance 242 and the cathode is connected to line 14. Feedback diode 245 and a small resistance 248 are connected in series between line 10 and junction 244. Similarly, feedback diode 246 and resistance 250 are connected in series between line 14 and junction 244. Commutation capacitors 252 and 254 are connected between junction 244 and, respectively, lines 10 and 14. The diodes, connected in inverse parallel with the controlled rectifiers, feed back energy stored in the inductance 242 after commutation, and the resistances appropriately dissipate the trapped energy. Controlled rectifiers 236 and 238 are gated sequentially at a predetermined frequency by means of periodic firing pulses applied from the field controlled circuit 33 illustrated in FIG. 1, to, respectively, gate terminal 256 of controlled rectifier 236 and gate terminal 258 of controlled rectifier 238. The described arrangement provides for self commutation of controlled rectifiers 236 and 238 so as to provide for their alternate conduction. By varying the time occurrence of the control signal applied respectively to terminals 256 and 258 from the field control 33, the respective conduction times of devices 236 and 238 may be modified. The respective conduction times of devices 236 and 238 establishes the average potential at terminal 244. When device 238 is gated on and device 236 is off, terminal 244 is effectively at the potential of line 14. When device 236 is gated on and device 238 is off, terminal 244 is effectively at the potential of line 10. Therefore the average potential at terminal 244 corresponds to the ratio of the conduction time of device 236 to the total conduction time, per cycle, of devices 236 and 238.

Figure 3:
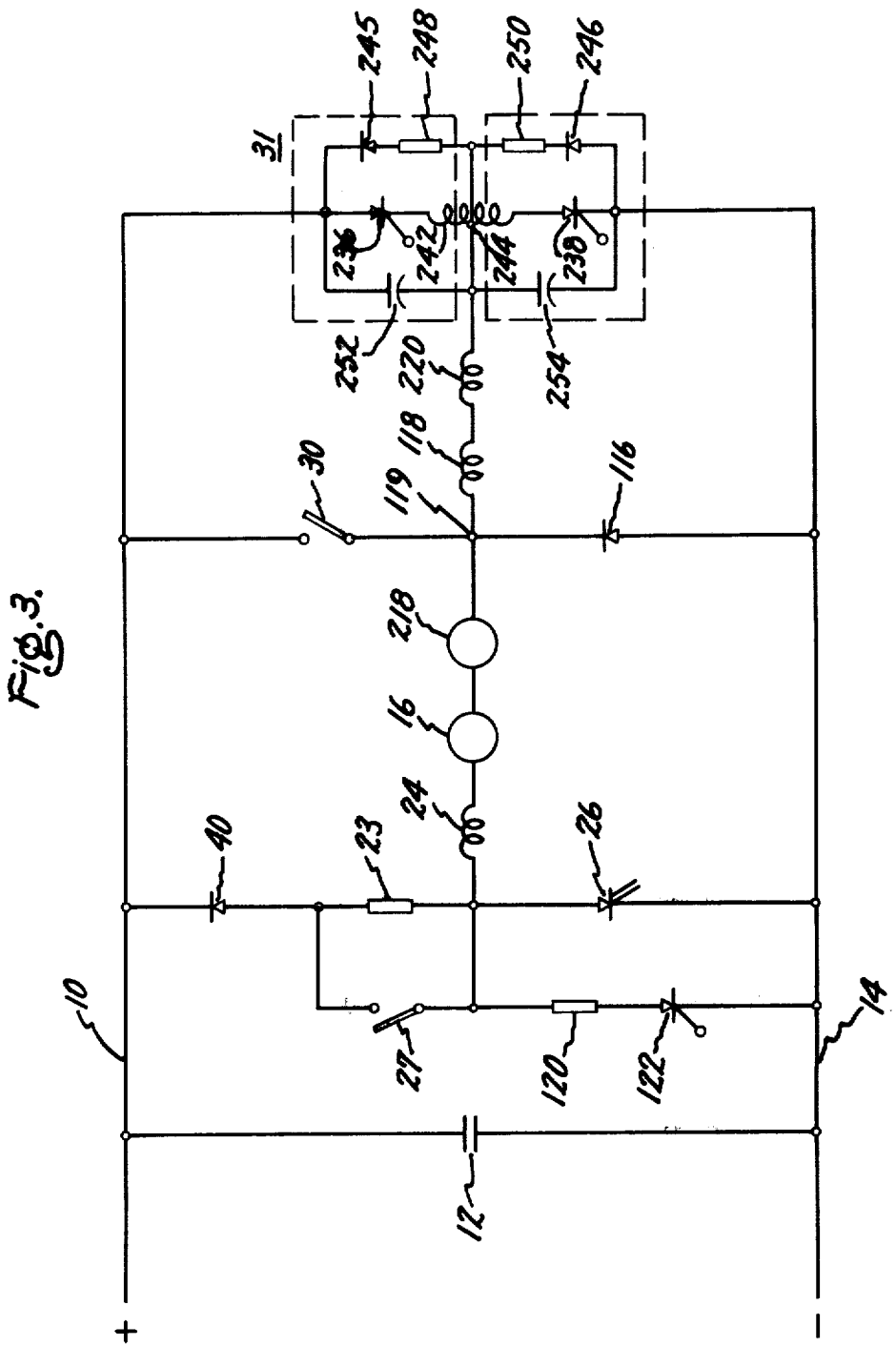
FIG. 3 is a simplified diagram of another embodiment of the invention.

FIG. 3 illustrates an alternate embodiment, differing from that described in connection with FIG. 1 and FIG. 2 in that the armature chopper is connected in circuit with connecting line 14 instead of connecting line 10. The breaker 30 is connected from positive conducting line 10 to the junction of motor armature 218 and unilaterally conducting diode 116. During the motoring mode a circuit is established through breaker 30, serially connected motor armatures 218 and 16, motor reactor 24 and armature chopper 26 to line 14.

The dynamic retarding circuit comprising serially connected resistance 120 and controlled rectifier 122 is connected in parallel with armature chopper 26. Breaking resistor 23 is connected serially with free wheeling diode 40 from the terminal of the motor reactance 24 and chopper 26 to line 10. The contactor 27 shunts the breaking resistor and is closed except for certain periods of regenerative braking, in a manner well known in the art. Unilaterally conducting means 116 is connected from the line 14 to the junction 119, between armature 218, breaker 30, and field means 18. The conduction path during regenerative braking is from armature means 218, 16, motor reactance 24, braking resistance 23, diode 40 line 10, the external d-c source (not shown), line 14, and unilaterally conducting means 116. The field source 31 may be of the same type as utilized in the embodiments of FIG. 1 and 2 and the field windings 220 and 18 are connected between the output terminal 244, of the field source 31, to the junction 119 in the same manner as previously described.

Various types of control may be utilized during the motor and retarding modes. For example, the same types of operation may be utilized as described in the co-pending application Ser. No. 433,409, and similar control circuit configurations may be utilized.

While the invention has been particularly shown and described with reference to specific embodiments, it will be understood that the apparatus as shown and described is merely illustrative and that the invention is not limited thereto, since changes in modifications will readily occur to persons skilled in the art, without departing from the true spirit and scope of the appended claims.

What I claim as new and desire to secure by Letters Patent of the United States is:

1. In a drive system for d-c motors, comprising armature and field means, coupled to drive a mechanical load during a motoring mode and to be driven by said load during a retarding mode, and wherein during said motoring mode said armature means are coupled between first polarity and second polarity conductors adapted to be connected to a d-c source and during the retarding mode the direction of current through said field means is reversed and the armature means are coupled to supply a circuit for dissipating generated armature current, the combination comprising:

a. said first and second conductors:
 b. said armature means comprising first and second terminals, said first terminal adapted to be coupled through armature impedance means to said first conductor;
 breaker switch means adapted to be open during the retarding mode and closed during the motoring mode, connected between said second terminal and said second conductor;
 d. conductive means conductive solely during the retarding mode connected from said second terminal to said first conductor.
 e. first and second impedance means coupled between said first and second conductors and at their junction providing a controllable voltage output terminal;
 f. said field means being coupled between said voltage output terminal and said second terminal so that field current flows in a first direction during the motoring mode and in a second direction during the retarding mode.

2. The arrangement of claim 1 wherein said first and second impedance means each comprise switching means adapted to be sequentially and alternately conducting.

3. The arrangement of claim 2 comprising means for varying the conduction time of one of said switching means in respect to that of the other switching means for controlling the average potential at the controllable output terminal.

4. The arrangement of claim 3 wherein said conductive means comprises unilaterally conducting means poled to conduct generated armature current during the retarding mode.

5. The arrangement of claim 4 wherein said armature impedance means comprises chopper switching means.

6. The arrangement of claim 5 wherein said first and second switching means comprise controlled rectifiers connected in a self commutating back-to-back chopper circuit.

7. The arrangement of claim 6 wherein unilaterally conducting means are coupled from said second conductor to said first terminal of the armature means.

8. The arrangement of claim 2 wherein capacitance means are coupled across said first and second conductors.

9. The arrangement of claim 2 wherein means for boosting current through said field means in the retarding mode direction comprise a source of potential and unidirectionally conducting means coupled in series circuit with said field means, said unidirectionally conducting means being poled to conduct current from said source of potential through said field means in the retarding mode direction.

10. In a drive system for d-c motor means coupled to a mechanical load, said motor means comprising armature means and separately excited field means and being effective with said mechanical load moving in a given direction to drive the load in a motoring mode and to be driven by the load in a retarding mode, said armature means being coupled through armature impedance means to a d-c source having a pair of conductors at different potentials, the improvement comprising:

a. first and second impedance means connected in series with one another between said conductors for providing at an output terminal coupled to their junction a controllable field voltage;

b. means for controlling said first and second impedance means so as to vary as desired, within a range defined by the respective potentials on said conductors, the average magnitude of voltage at said output terminal;

c. switch means having a pair of terminals and adapted to be open during said retarding mode and closed during said motoring mode, one of said terminals being connected to a first one of said pair of conductors;

d. conductive means for connecting the other terminal of said switch means to the other one of said conductors, said conductive means being conductive solely when said switch means is open;

e. means for coupling said field means between said field voltage output terminal and said other terminal of said switch means, whereby field current flows between said output terminal and said other terminal in one direction when said switch means is closed during said motoring mode and in the opposite direction when said switch means is open and said conductive means is conductive during said retarding mode; and f. means for connecting said other terminal of said switch means to said armature means, whereby said switch means is included in the coupling between said armature means and said d-c source during said motoring mode.

11. The improvement of claim 10 wherein said first and second impedance means comprise switching means adapted to be sequentially and alternately conducting.

12. The improvement of claim 10 wherein said conductive means comprises a rectifier poled to block current when said other terminal has substantially the same potential as said first one of said conductors due to said switch means being closed.

13. The improvement of claim 10 further comprising means for controllably boosting current through said field means in said retarding mode direction.

14. The improvement of claim 10 further comprising a capacitor connected across said conductors.

* * * * *